July 1, 1958        J. W. BREM        2,840,933
COMBINATION SCRAPER AND SCARIFIER ATTACHMENT FOR TRACTOR
Filed Nov. 12, 1953        2 Sheets—Sheet 1

INVENTOR.
JACK W. BREM
BY Knox & Knox
ATTORNEY IN FACT
FOR APPLICANT

July 1, 1958  J. W. BREM  2,840,933
COMBINATION SCRAPER AND SCARIFIER ATTACHMENT FOR TRACTOR
Filed Nov. 12, 1953  2 Sheets-Sheet 2

INVENTOR.
JACK W. BREM
BY
Knox & Knox
ATTORNEY IN FACT
FOR APPLICANT

United States Patent Office 2,840,933
Patented July 1, 1958

2,840,933

COMBINATION SCRAPER AND SCARIFIER ATTACHMENT FOR TRACTOR

Jack W. Brem, San Diego, Calif.

Application November 12, 1953, Serial No. 391,407

3 Claims. (Cl. 37—145)

The present invention relates generally to earth working equipment and more particularly to a combination scraper and scarifier attachment for a tractor.

The primary object of this invention is to provide a combination scraper and scarifier in which the implements are individually or simultaneously adjustable vertically, so that the earth may be worked to any desired level and so that each implement may be used independently.

Another object of this invention is to provide an attachment in which the position of the implements may be controlled by the tractor operator from his normal operating position.

Another object of this invention is to provide an attachment in which the implements are actuated by fluid pressure from a source of supply on the tractor.

Another object of this invention is to provide an attachment in which the implements are arranged so that the earth is first scarified and then levelled by the scraper to produce a satisfactory seed-bed, or finished grade.

Another object of this invention is to provide a combination scraper and scarifier which is inexpensive and practicable to manufacture.

Finally, it is an object to provide a combination scraper and scarifier of the aforementioned character which is simple, safe and convenient to operate, and which will give generally efficient and durable service.

With these and other objects definitely in view, this invention consists in the novel construction, combination and arrangement of elements and portions as will be hereinafter fully described in the specification, particularly pointed out in the claims and illustrated in the drawings which form a material part of this disclosure and wherein similar characters of reference indicate similar or identical elements and portions throughout the specification and throughout the views of the drawings, and in which:

Figure 1:
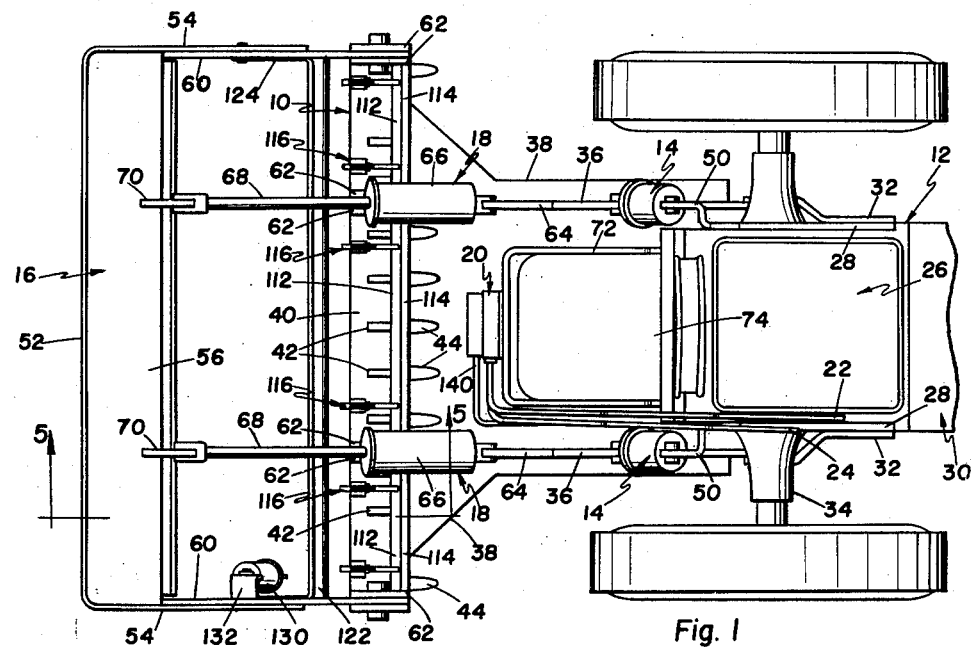
Fig. 1 is a plan view of the device attached to a tractor, the hydraulic piping being omitted for clarity.
Figure 2:
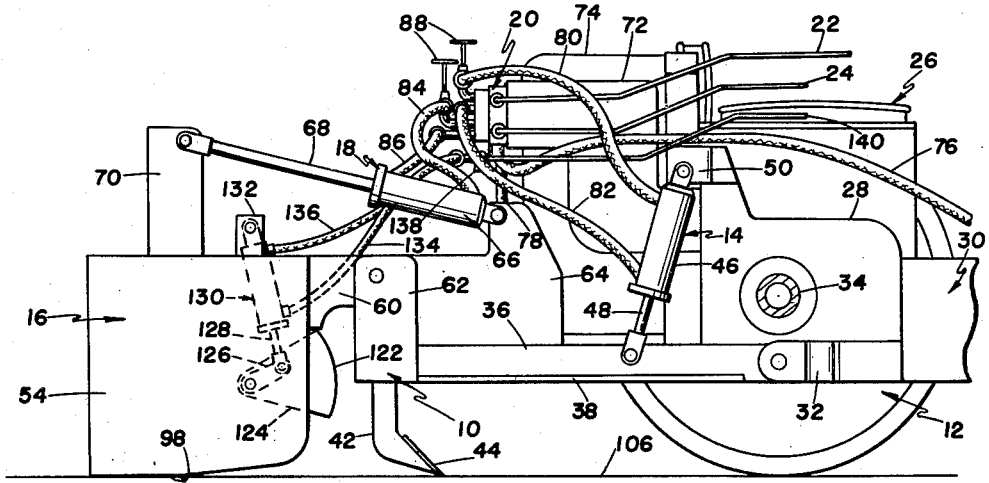
Fig. 2 is a side elevation view of the structure, one wheel of the tractor being omitted.

Referring now to the drawings, the structure includes a scarifier 10 which is pivotally mounted at the rear of a tractor 12 and is vertically adjusted by means of hydraulic jacks 14. Pivotally attached to the scarifier 10 is a scraper 16 which is adjusted independently of the scarifier by further hydraulic jacks 18. The operation of the hydraulic jacks 14 and 18 is controlled through a valve unit 20, from which a pair of control levers 22 and 24 extend to a position alongside the seat 26 of the tractor, so as to be accessible to the tractor operator.

The tractor 12 is fitted with a pair of support plates 28 which are secured to each side of the tractor frame 30 below the seat 26. At the lower end of the support plates 28 are hinge brackets 32 which are joggled outwardly and are located approximately below the rear axle 34 of the tractor. To these hinge brackets 32 are pivoted the support arms 36 which carry the scarifier 10, said support arms being reinforced by means of webs or gussets 38. The majority of the structure is welded together for simplicity although, of course, other methods of construction may be used if desired.

The scarifier 10 comprises a transverse beam 40 of box-like structure which is attached to the ends of the support arms 36. A plurality of teeth 42 of conventional design are secured substantially vertically in the beam 40, each tooth having a tip shoe 44 at the lower end thereof, the tip shoes being substantially at ground level when the support arms 36 are horizontal.

The jacks 14 are conventional and each include a cylinder 46 from which extends telescopic actuating rod 48. The actuating rods 48 are connected to the support arms 36 intermediate the scarifier and the hinge brackets 32, the cylinders 46 being attached to fixed lugs 50 on the upper ends of the support plates 28.

The scraper 16 comprises a back plate 52, the ends of which are extended forward to form end plates 54. This structure is reinforced by a top plate 56 and a bottom plate 58, which are secured along the upper and lower edges respectively of the back plate 52 and to the end plates 54. Secured to the top plate 56 and extending forwardly therefrom are a plurality of hinge members 60, which are pivotally mounted between pairs of upright spaced brackets 62. Two pairs of these brackets 62 are secured to the ends of the beam 40, others being located inboard of the ends adjacent the support arms 36 and in alignment with the hinge members 60. The brackets 62 are thus located so that the scraper 16 is pivoted on a horizontal axis between the scraper and the point of attachment of the support arms 36 to the tractor. This permits the depression of the scraper in tilted position so that it can be efficiently used as a packer and leveller, with the scarifier raised into inoperative position.

Secured to the upper edges of the support arms 36 and extending upwardly therefrom are mounting plates 64 to which the cylinders 66 of the jacks 18 are attached. The actuating rods 68 of these jacks are connected to lever arms 70 extending upwardly from the top plate 56, said lever arms being additionally secured to the inboard hinge members 60. Thus the scraper 16 is pivoted vertically relative to the scarifier 10 by contraction or expansion of the jacks 18, while the scarifier is pivoted vertically relative to the tractor 12 by the jacks 14.

The valve unit 20 is mounted on the rear face of a mounting bracket 72 which is attached to the sides of the tractor frame 30 and extends around the rear of the fuel tank 74, this being the position of the fuel tank on many types of tractors. The valve unit 20 is a conventional assembly, the structure and operation of which is understood by those skilled in the art. This particular valve unit contains a pair of two way valves to which the control levers 22 and 24 are connected. By raising or lowering the control levers, pressurized fluid is permitted to flow in either direction selectively so that the jacks 14 and 18 may be expanded or contracted as desired. The valve unit 20 is connected by means of a feed line 76 to a source of pressurized fluid (not shown), many types of tractors having a pump or like for such a purpose as standard equipment. Excess fluid is returned to the source through a drain line 78.

The upper and lower ends of the jacks 14 are connected to the valve unit 20 by pairs of hoses 80 and 82 respectively, while the front and rear ends of the jacks 18 are connected to the valve unit by hoses 84 and 86 respectively. Thus pressurized fluid is fed to both pairs of jacks, it being evident from the drawings that the upper control lever 22 operates the jacks 14 while the lower control lever 24 operates the jacks 18. For example, when the control lever 22 is raised, fluid flows through the hoses 82 to the lower ends of the jacks 14 causing the actuating rods 48 to be retracted, thus raising the support arms 36. Similarly, when the control lever 22 is depressed, fluid flows through the hoses 80 to the upper ends of the jacks 14 causing the actuating rods 48 to be extended, so lowering the support arms 36.

The hoses 80 and 84 are provided with shut-off valves 88 so that the pressure feed to the jacks on one side may be interrupted. The complete scraper and scarifier assembly may be raised to the full up position and the shut-off valves 88 closed. An additional implement such as a carryall or other tool (not shown) may then be attached to the tractor. With the valves 88 closed, the hoses 80 to 86 can then be disconnected from the jacks as required and connected to the carryall or the like. Thus a quick change may be made from one tool to another without removing the scraper and scarifier.

Figure 5:
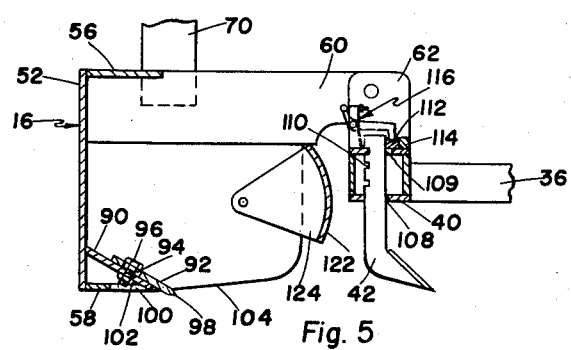
Fig. 5 is a fragmentary sectional view taken on the line 5—5 of Fig. 1.

The scraper 16 has therein a blade support 90 which is secured at an angle along the forward edge of the bottom plate 58 and to the back plate 52. Bolted to the blade support 90 is a removable blade 92, said blade having slotted openings 94 to receive the bolts 96, so that the cutting edge 98 may be adjusted to the required depth below the scraper structure as shown in Fig. 5. The bottom plate 58 has a plurality of slots 100 to allow access to the nuts 102 so that the blade may be adjusted or removed as necessary. It should be noted that the lower edges 104 of the end plates 54 slope slightly upwardly forward of the blade 92 to provide clearance for the cutting edge 98 at certain positions of the scraper.

Figure 4:
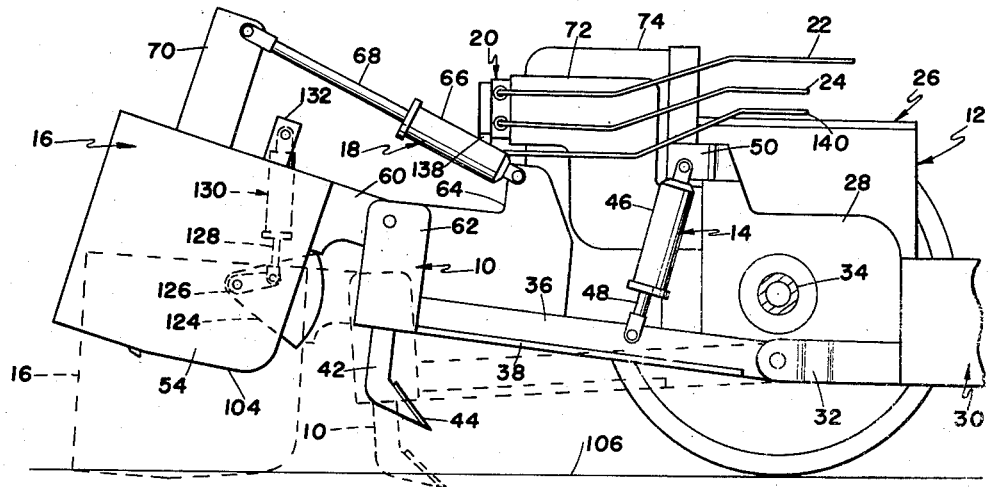
Fig. 4 is a side elevation view similar to Fig. 2 but showing the implements in raised and lowered positions.

The device may be used for a variety of purposes such as breaking up the surface of the ground by use of the scarifier or levelling the surface with the scraper. One particular function of the device is the preparation of seed beds, for which the scarifier teeth 42 and the blade 92 are lowered slightly below the ground line 106 as shown dotted in Fig. 4. The teeth 42 may be lowered below the cutting edge 98 of the blade 92 by adjustment in the beam 40. The teeth 42 are fitted through slots 108 and 109 in the upper and lower walls of the beam 40 and are each provided with a plurality of spaced notches 110 which are selectively engaged with the upper wall of the beam 40 at the sides of the upper slots 109 as shown in Fig. 5. The teeth 42 are locked firmly in place by removable detent bars 112 fitted between the upper ends of the shank portions of said teeth and the fixed retaining bars 114. The detent bars 112 are held in position by pivoted clamps 116 of a suitable type, many of which are available. The screw type clamps shown as an example are easily released to permit removal of the detent bars 112 and the adjustment of the teeth 42.

The scarifier teeth of this type are normally held in place by individual wedges which must be removed singly to allow adjustment of the teeth. Thus it will be seen that the present invention permits quicker adjustment or replacement of the scarifier teeth than is normally possible.

As the tractor is driven forward, the soil is broken by the teeth 42 and is then pulverized and levelled by the blade 92, so that a level layer of loose soil is provided in which seeds are easily sown.

The scraper 16 may be fitted with an auxiliary or removable blade 118 having end flanges 120 which are bolted to the end plates 54. The blade 118 extends forwardly close to the forward edge of the scraper 16 and thus effectively closes the lower portion of said scraper.

Figure 6:
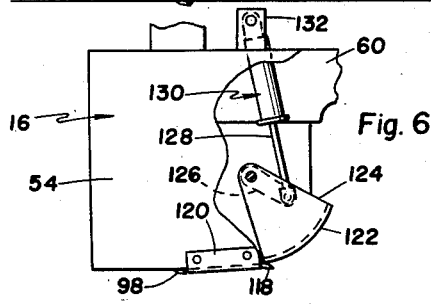
Fig. 6 is a fragmentary side elevation view showing the scraper in use as a carrying bucket.
Figure 3:
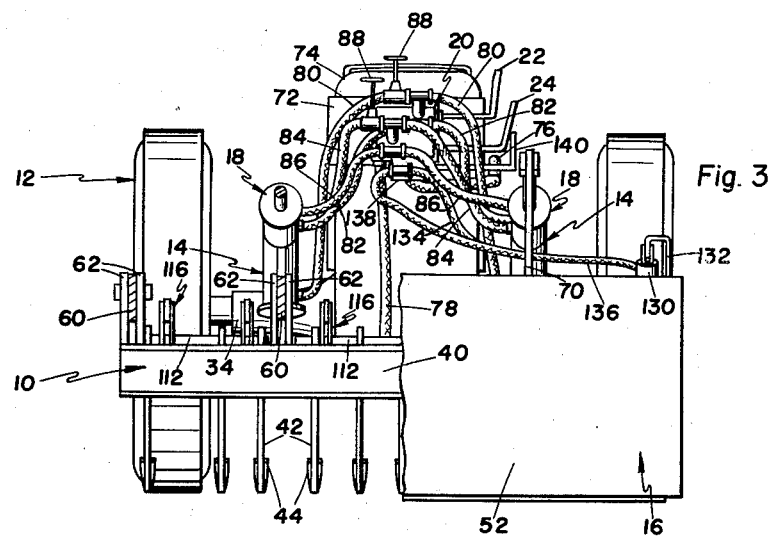
Fig. 3 is an end elevation view of the device, the scraper being partially cut away.

In order to use the scraper 16 as a carrying bucket, a gate 122 is provided, said gate having end lugs 124 which are pivotally attached to the end plates 54. At one end the gate 122 is fitted with a lever 126 to which is attached the actuating rod 128 of a jack 130, the other end of said jack being attached to a bracket 132 mounted on the upper edge of the end plate 54. The jack 130 is connected by hoses 134 and 136 to a fluid valve 138, from which is extended a control lever 140. Thus the gate 122 may be raised and lowered from the operator's position together with the other controls. In the raised position, as shown in Figs. 1 to 5, the gate provides ample clearance at the front of the scraper. When the blade 118 is attached and the gate 122 is lowered, as shown in Fig. 6, the scraper is effectively closed to retain the soil collected therein, so that the soil may be carried to the desired location and dumped. When the blade 118 is not attached, the gate 122 facilitates retention of a more ample supply of loose dirt in the bucket for leveling purposes in the preparation of a seed bed or finished grade.

The scraper may also be pushed by the tractor in reverse, using the lower edge of the back plate 52 to level the surface, a particularly useful feature in enclosed spaces. The device may be used in this manner to move loose soil or snow, the scraper being lowered and the scarifier raised to prevent the teeth 42 from digging into the soil. When not in use, the scraper and scarifier may be raised to the position shown in full line in Fig. 4, so that the progress of the tractor is unimpeded.

The operation of this invention will be clearly comprehended from a consideration of the foregoing description of the mechanical details thereof, taken in connection with the drawing and the above recited objects. It will be obvious that all said objects are amply achieved by this invention.

Further description would appear to be unnecessary.

I claim:

1. A combination scraper and scarifier attachment for a tractor including a scarifier comprising a beam member having therein a plurality of depending teeth, a pair of support arms attached to said beam member, means for securing said support arms to a tractor, pairs of spaced brackets on said beam member, a scraper comprising a back plate and extended end plates thereon, a blade support angularly mounted adjacent the lower edge of said back plate, an adjustable blade removably attached to said blade support and extending below the level of said back plate, said scraper being mounted for pivotal movement about a horizontal axis between the scraper and said means, said scraper having a second blade removably secured to said end plates in front of the first mentioned blade and slightly above the level of the first mentioned blade when the scraper is normally positioned with said back plate vertically disposed, means operatively connected to raise and lower said scarifier, and means operatively connected to raise and lower said scraper relative to said scarifier.

2. A combination scraper and scarifier attachment according to claim 1, wherein said scarifier teeth have vertically spaced notches selectively engaging a portion of said beam member whereby said teeth are vertically adjustable in said beam, said teeth having portions extending above said beam, a retaining bar fixed to the top of said beam, removable detent means disposed between said portions and said retaining bar and holding said teeth in selected positions, and quick release clamp means holding said detent means.

3. A combination scraper and scarifier attachment for a tractor, comprising a scarifier pivotally mounted on a tractor, means operatively connected to raise and to lower said scarifier, a scraper pivotally attached to said scarifier, means operatively connected to raise and lower said scraper relative to said scarifier, said scraper having a back wall with a blade adjacent the back wall and an open front, a gate operatively mounted on said scraper for partially closing said open front, means operatively connected to raise and lower said gate, and manual control means for said last mentioned means, said gate constituting means to facilitate retention of an ample supply of loose dirt in the scraper during leveling operations.

References Cited in the file of this patent

UNITED STATES PATENTS

| | | |
|---|---|---|
| 1,755,631 | Burnett | Apr. 22, 1930 |
| 1,829,728 | Beatty et al. | Nov. 3, 1931 |
| 2,052,182 | Le Bleu | Aug. 25, 1936 |
| 2,104,675 | Ruff | Jan. 4, 1938 |
| 2,284,388 | Gurries | May 26, 1942 |
| 2,329,831 | Ferguson | Sept. 21, 1943 |
| 2,332,561 | Drott | Oct. 26, 1943 |
| 2,348,910 | Kadz | May 16, 1944 |
| 2,566,562 | Hale | Sept. 4, 1951 |
| 2,578,131 | Gannon | Dec. 11, 1951 |
| 2,642,681 | Wagner | June 23, 1953 |

FOREIGN PATENTS

| | | |
|---|---|---|
| 137,087 | Australia | May 1, 1950 |